(No Model.) 2 Sheets—Sheet 1.

G. H. & J. F. STEWARD.
GRAIN ADJUSTING MECHANISM FOR HARVESTERS.

No. 391,094. Patented Oct. 16, 1888.

Witnesses:
John B. Kaspari.
J. D. Middlekauff.

Inventors:
John F. Steward.
George H. Steward.
By John F. Steward.
His Atty.

(No Model.) 2 Sheets—Sheet 2.
G. H. & J. F. STEWARD.
GRAIN ADJUSTING MECHANISM FOR HARVESTERS.
No. 391,094. Patented Oct. 16, 1888.
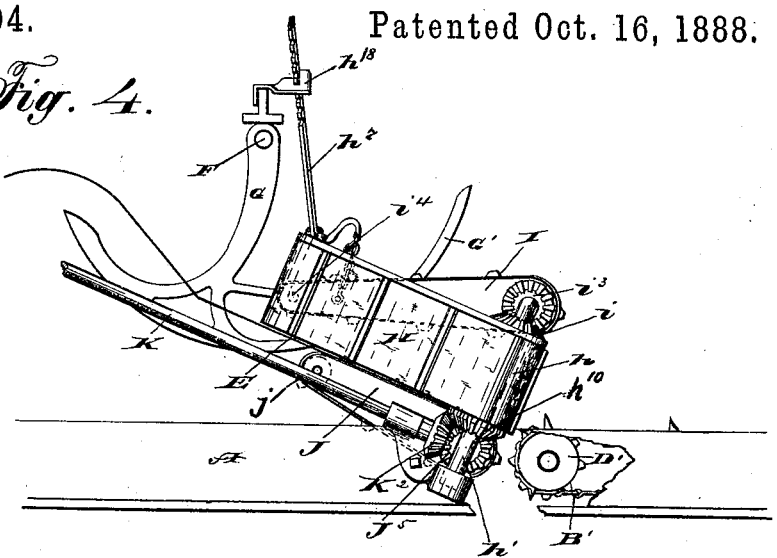
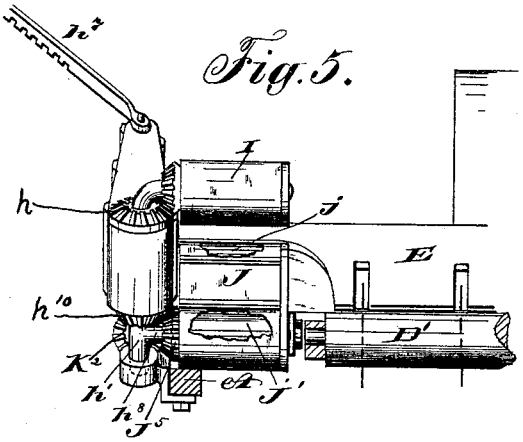
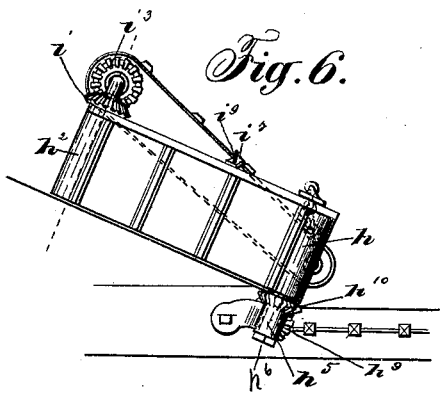
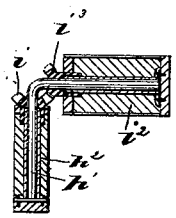
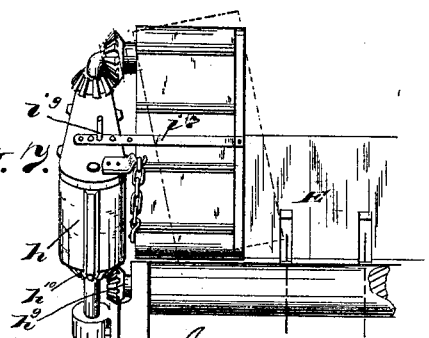
Witnesses:
John B. Caspari.
P. D. MiddleKauff
Inventors:
John F. Steward.
George H. Steward
By John F. Steward.
His Atty.

United States Patent Office.

GEORGE H. STEWARD, OF PLANO, AND JOHN F. STEWARD, OF CHICAGO, ILLINOIS.

GRAIN-ADJUSTING MECHANISM FOR HARVESTERS.

SPECIFICATION forming part of Letters Patent No. 391,094, dated October 16, 1888.

Application filed October 3, 1884. Serial No. 144,638. (No model.)

*To all whom it may concern:*

Be it known that we, GEORGE H. STEWARD, of Plano, in the county of Kendall and State of Illinois, and JOHN F. STEWARD, of Chicago, in the county of Cook and State of Illinois, have invented certain new and useful Improvements in Grain-Adjusting Mechanism for Harvesters, of which the following is a full description, reference being had to the accompanying drawings.

Our invention relates to various improvements in those butt-adjusting mechanisms in which an endless traveling apron presents one of its faces in position to act upon the butts of the cut grain passing thereby.

Figure 1:
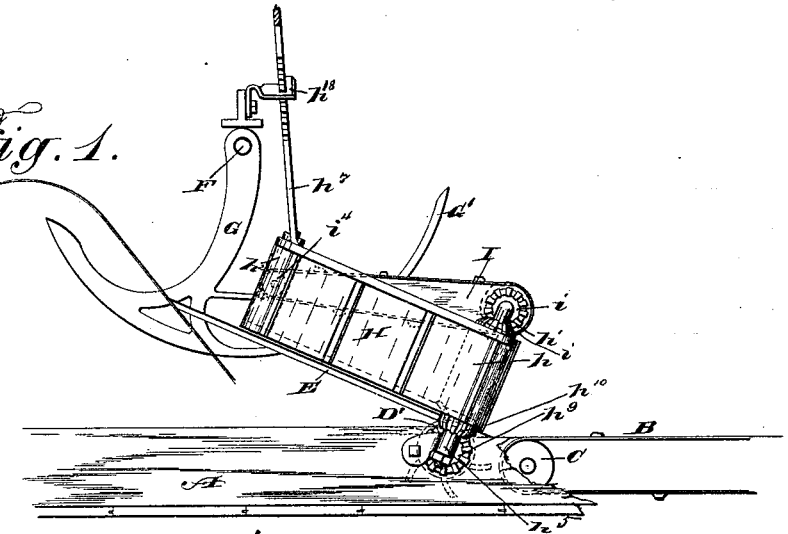
Figure 2:
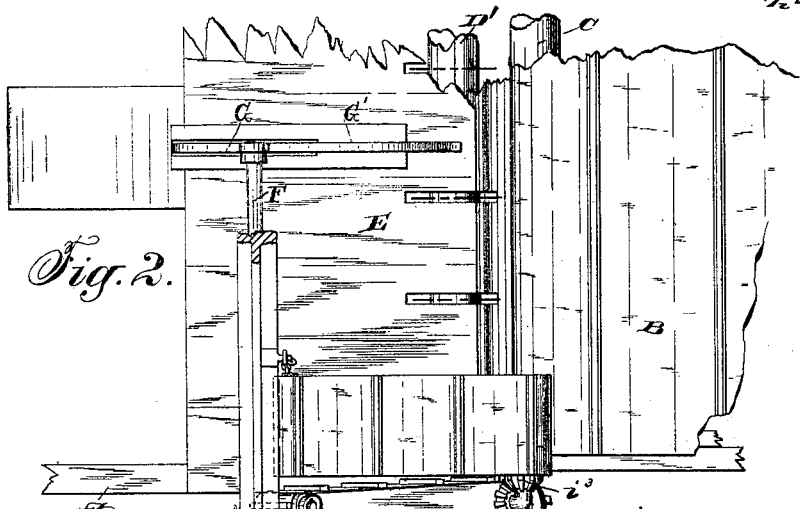
Figure 3:
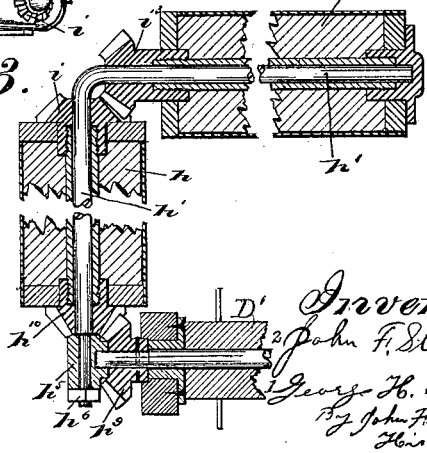

Figure 1 is a front elevation of our mechanism; Fig. 2, a plan view of the same. Fig. 3 is a sectional view of the rollers for carrying the adjusting-canvases. Fig. 4 is a front elevation showing the parts situated similarly to those in Fig. 1, but with a canvas added to operate under the butts of the grain and a chain as a grain-conveyer. Fig. 5 is a grain-end view of the same parts somewhat modified. Fig. 6 is a front elevation of the canvases adapted to their work in a more simple manner, and one that we recommend as preferable. Fig. 7 is a grain-end view of the same. Fig. 8 is a sectional view of the rollers, showing the manner of connecting them.

A is the main sill of the grain-platform.

B is the delivery-canvas, and B' are delivering-chains often substituted for the canvas.

C is the delivery-canvas driving-drum.

D' is a roller provided with teeth, located with its axis parallel to the roller of the delivery-canvas, and so close thereto that its teeth shall receive the straws as they are delivered and carry them over onto the binder-decking. The teeth are made so curved that they will not draw the straws down through the slots in the decking. So made they are still sufficient to carry the straws away from the delivery end of the canvas B. In machines where chains are used to convey the grain no stripping-roller is necessary.

E is the binder-deck, located in relation to the delivery-apron, as shown and described in our application No. 100,000, filed July 5, 1883, patented January 17, 1888, No. 376,488.

F is the needle-shaft, and G is the needle.

H is the vertical butting-canvas, its rearmost surface located somewhat in advance of the cutting-line. This canvas is adapted to act against the butts of the straws and move them endwise when such movement is required, and its speed is such that it advances the butts as well. The speed at which this canvas runs is an important matter, as its successful operation depends largely upon it. This will be apparent when it is considered that, because the butts of the grain in falling after being cut slide forward and so project into the standing grain as to retard them, the straws are presented at the delivery end of the platform at a very considerable angle. This obliquity must be overcome. Hence the butts must be hastened. The hastening of the butts is the more necessary in that class of machines where the swath of grain is turned horizontally by the conveying mechanism and presented to a binding mechanism arranged obliquely or at an angle to the line of the cutter-bar.

$h'$ is the upright axis of the drum $h$, which carries the butting-canvas proper, in this instance being a stout bar of iron socketed into the casting $h^5$. A portion of its lower extremity is reduced in size and passes down through casting and receives the nut $h^6$. This method of fastening prevents the bar from rising out of the socket and leaves it free to be rocked on its axis. The delivery end of the canvas is drawn around the small drum $h^2$. The two drums are connected by the usual frame-work. As it is not usually necessary to change the position of the receiving end of the butter, we have shown no means for producing such change. The delivery end, however, is free to be adjusted to place its operative face at a greater or less angle to the cutter-bar, so as to deliver the grain centrally to the binder regardless of its length. An adjusting-rod, $h^7$, is attached to the butter-frame and provided with a series of notches to engage the plate $h^{18}$ on the main frame, whereby the butter-frame may be fixed in different positions, if required.

Along the rear side of the canvas H, and adapted to act upon the butts carried by it, is the canvas or chain belt I. This may be given motion in a variety of ways, one only of which we have deemed it necessary to show. We provide upon the upper end of one of the drums of the canvas H a bevel-gear, $i$. The standard $h'$, upon which the drum of the butting-canvas runs, is made to pass a little above the butting-canvas frame, and is then bent inward, or, more properly, backward; and upon this, and free to revolve thereon, we place the drum, $i^2$, which is provided with the bevel-gear $i^3$, adapted to engage with $i$.

$i^4$ is a drum suitably supported in a frame common to itself and the drum $i^2$. At its driven end this canvas is a predetermined height above the decking of the binder; but we make the other end adjustable at will by linking it by means of a chain or other suitable mechanism to the frame-work of the machine. The space between this canvas and the deck may be varied; but in all cases it should be so near that the grain will be engaged with sufficient pressure to be forced along. We have shown the canvas in one case (Figs. 1 to 5, inclusive) with the delivery end free to rise and fall, and in another (Figs. 6 and 7) the receiving end capable of the same movement. This last method we prefer and recommend, as the receiving end may be hung so low as to serve the double purpose of taking the butts away from the end of the sickle, where these with grass and weeds accumulate and would otherwise hang, and carrying them forward. In this method we find it advantageous to let the receiving end reach at least as far toward the incoming grain as the first guard of the cutting apparatus, as shown in Fig. 6. The suspending-chain should be so long that the free end of the canvas may lie very close to the decking. So made very little grass and weeds can accumulate. For convenience the canvas is suspended from the frame of the vertical or butting canvas, as in Fig. 7.

It will be seen that the axes upon which the drums having the gears to impart motion from one to the other turn do not rotate and that they are as one piece. When the butting-canvas is swung, it moves around the bar $h'$ as an axis, and, the canvas I being suspended therefrom, the former carries the latter with it, the bar $h'$ moving in the socket $h^5$ to permit it.

In order to prevent the two canvases H and I from swinging out of position in relation to each other, we connect them, as shown in Fig. 7, by the metallic strap $i^7$, loosely connected to the frame of the canvas I and to the frame of the butting-canvas by means of a pin, $i^9$, onto which any of the holes which we provide in the said strap may pass. By means of this adjustment the canvas I may be made to act directly upon the butts of the grain or a little way therefrom, as the varying conditions of grain may require.

So far as described the grain is moved over the deck, sliding thereon. To reduce the friction and to assist in moving the grain, we cut away the decking, as shown in Fig. 5, and place in the recess thus formed a third canvas, $i^t$, however, operating beneath the butts of the grain. When this canvas is used, the stripping-roller D' is made shorter and the drum of this canvas made to fill the space thus made. To form an axis for the drum J' of this canvas, we throw out the arm $h^8$ from the vertical rod $h'$, parallel with the axis of the drum $i^2$. This drum is suitably connected by a frame, which forms bearings for both, to the drum $j$, and the canvas is drawn around the two in the usual manner.

In Figs. 1, 3, 6, and 7 the driving-power is shown to be a bevel-gear on the shaft K of the stripping-roller, meshing into a pinion at the lower end of the drum which moves the butting-canvas.

In Figs. 4 and 5 a special shaft, K, is shown having the gear $K^2$, which meshes into those $J^5$ and $h^{10}$.

Our invention is especially well adapted to low-level binders, where the butt-adjusting mechanism cannot act upon falling grain, as it does in self-binding harvesters, because of the canvases being adapted to force the butts along, even though the centers of the straws are obstructed by the needle during the operation of binding.

F is the needle-shaft, suitably supported in bearings on the binder-frame, and G is the needle, provided with the extension G'. The needle is shown as thrust downwardly through the deck, as in the operation of binding of a gavel. The extension of the needle serves as a pivot around which the straws are forced to wheel by the movement of the butt-advancing canvases while it is down, as shown, and it acts to increase the effect of the said canvases. Thus the mass of grain that accumulates and forms the first part of every gavel is always well wheeled into position.

We have used a chain in place of the canvas I with very good results, but prefer and recommend the construction here shown, yet do not wish to confine ourselves to either.

What we claim is—

1. In a harvesting and binding machine, the combination of a supporting surface whereon the grain is moved laterally, an overlying conveyer acting on the butts of the grain only to compress and confine the same, and the adjusting mechanism arranged to act on the butts of the grain and move the same endwise, whereby said elements are enabled to co-operate in advancing the grain, adjusting the same endwise, and holding it in position to prevent it from sliding out of adjustment.

2. A butt-adjusting apron adapted to act on the end of the grain-straws and move them longitudinally, in combination with a vertically-adjustable grain-conveying mechanism lying adjacent to the adjusting mechanism and adapted to act conjointly therewith on the butts of the straw, whereby the straw is carried both laterally and longitudinally to the required position.

3. The butting mechanism adapted to act upon the butts of the straws and to deflect them in their line of travel, said mechanism adapted to be adjusted at will to give the grain acted upon any amount of deflection, combined with overhung conveying mechanism adapted to operate upon the straws at a point so near the butts as to co-operate with said butting mechanism, also adjustable, so as to assist in changing the direction of movement of the grain, substantially as described.

4. The butting mechanism adapted to act upon the butts of the straws to hasten or to deflect them in their line of travel, combined with overhung conveying mechanism adapted to engage the straws at a point so near the butts as to co operate with said butting mechanism, adjustable as to its height, so as to be conformable to the greater or less body of grain being moved beneath it, substantially as described.

5. The butting mechanism adapted to act upon the butts of the straws to hasten or deflect them in their line of travel, combined with overhung conveying mechanism adapted to engage the straws at a point so near the butts as to co-operate with said butting mechanism, said conveying mechanism adapted to be raised and lowered automatically by the passage of the grain acted upon, substantially as described.

6. In combination with the butting device, the overhung conveying mechanism, and means for independently adjusting said mechanism so that its line of travel may be oblique to the said butting device, substantially as described.

7. The table E, the butting device H, and the conveying mechanism, said mechanism adapted to rise and fall over the said table, combined substantially as and for the purpose described.

8. The table E, the butting mechanism H, the overhung conveyer, and mechanism whereby the conveyer is adapted to be adjusted to any desired height above the said table, combined substantially as and for the purpose described.

9. The table E, the butting device H, the conveying mechanism adapted to be retained at a definite height above the grain-table, yet free to be automatically raised by masses of grain, all combined substantially as and for the purpose described.

10. The laterally-swinging butt-adjuster and the vertically-swinging conveyer, in combination with the connecting and driving devices uniting the conveyer to the movable end of the butting device.

11. The butting mechanism adapted to act upon the butts of the grain, the overhung conveying mechanism I, the lower conveying mechanism, J, and means whereby they may be adjusted to deliver the grain to varying positions on the grain-table, arranged and combined substantially as described.

12. The angular rod $h'$, combined with and adapted to sustain and form journals for drums $h$ and $i'$.

13. The standard $h'$ and the canvas-driving drums revolving thereon and having the intermeshing gears $i$ and $i^3$, all combined substantially as and for the purpose described.

GEORGE H. STEWARD.
JOHN F. STEWARD.

Witnesses to signature of George H. Steward:
E. L. HENNING,
R. C. MIGHELL.

Witnesses to signature of John F. Steward:
JOHN B. KASPARI,
GILBERT B. SNOW.